(12) United States Patent
Furutani et al.

(10) Patent No.: US 8,537,580 B2
(45) Date of Patent: Sep. 17, 2013

(54) CONTROLLER OF POWER CONVERTER

(75) Inventors: Shinichi Furutani, Tokyo (JP); Akira Satake, Tokyo (JP); Jun Sawaki, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 361 days.

(21) Appl. No.: 12/811,742

(22) PCT Filed: Jan. 18, 2008

(86) PCT No.: PCT/JP2008/050638
§ 371 (c)(1),
(2), (4) Date: Jul. 6, 2010

(87) PCT Pub. No.: WO2009/090755
PCT Pub. Date: Jul. 23, 2009

(65) Prior Publication Data
US 2010/0277149 A1    Nov. 4, 2010

(51) Int. Cl.
*H02M 3/24* (2006.01)
*H02M 7/537* (2006.01)
*H02P 1/04* (2006.01)
*H03K 5/00* (2006.01)

(52) U.S. Cl.
USPC ...... 363/95; 363/131; 318/400.17; 318/400.2

(58) Field of Classification Search
USPC .................. 363/39–41, 95, 97, 98, 131, 132; 318/798, 801, 805–812, 400.17–400.1, 400.3, 318/400.32
See application file for complete search history.

(56) References Cited

U.S. PATENT DOCUMENTS

| 5,068,777 | A | 11/1991 | Ito |
| 6,873,125 | B2 | 3/2005 | Seima et al. |
| 7,639,518 | B2 * | 12/2009 | Shin et al. ...................... 363/41 |
| 2006/0131960 | A1 | 6/2006 | Aritsuka |

FOREIGN PATENT DOCUMENTS

| CN | 101064483 A | 10/2007 |
| JP | 64-26395 A | 1/1989 |
| JP | 64 064504 | 3/1989 |
| JP | 09 247947 | 9/1997 |

(Continued)

OTHER PUBLICATIONS

Japanese Office Action issued Apr. 24, 2012 in Patent Application No. 2009-549945 with a Partial English Translation.

(Continued)

*Primary Examiner* — Bao Q Vu
*Assistant Examiner* — Zekre Tsehaye
(74) *Attorney, Agent, or Firm* — Oblon, Spivak, McClelland, Maier & Neustadt, L.L.P.

(57) ABSTRACT

A controller that controls a switching element of an inverter using pulse width modulation is applied to a power converter including an inverter, to realize a stable change of a carrier frequency, current control responsiveness, and inverter loss suppression. The controller includes a carrier-frequency setting unit that sets a carrier frequency command used for pulse width modulation of an inverter corresponding to a current command and a current-command change rate. The carrier-frequency setting unit includes a carrier frequency map having mapped thereon information of a carrier frequency corresponding to a current command expressed in a vertical axis and a current-command change rate expressed in a lateral axis, and outputs information of a carrier frequency on the carrier frequency map corresponding to the input current command and the input current-command change rate to a switching pattern calculator.

5 Claims, 11 Drawing Sheets

(56) References Cited

FOREIGN PATENT DOCUMENTS

| | | |
|---|---|---|
| JP | 10-164884 A | 6/1998 |
| JP | 10 271835 | 10/1998 |
| JP | 2000 134990 | 5/2000 |
| JP | 2001 037248 | 2/2001 |
| JP | 2002 010668 | 1/2002 |
| JP | 2003 116280 | 4/2003 |
| JP | 2003 299377 | 10/2003 |
| TW | 1292974 | 1/2008 |
| WO | WO 2006/006288 | 1/2006 |

OTHER PUBLICATIONS

Office Action issued Dec. 26, 2011, in Taiwanese Patent Application No. 097127750.
U.S. Appl. No. 12/810,072, filed Jun. 22, 2010, Furutani et al.
U.S. Appl. No. 12/811,742, filed Jul. 6, 2010, Furutani et al.
Chinese Office Action issued Aug. 3, 2012, in China Patent Application No. 200880124988.5.
European Search Report issued May 23, 2013 in European Application No. EP 08703488.0.

* cited by examiner

FIG.2
(a)
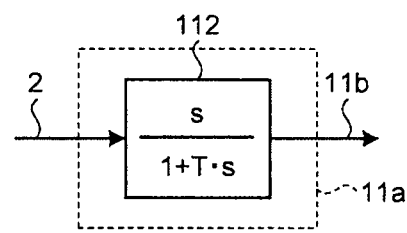
(b)
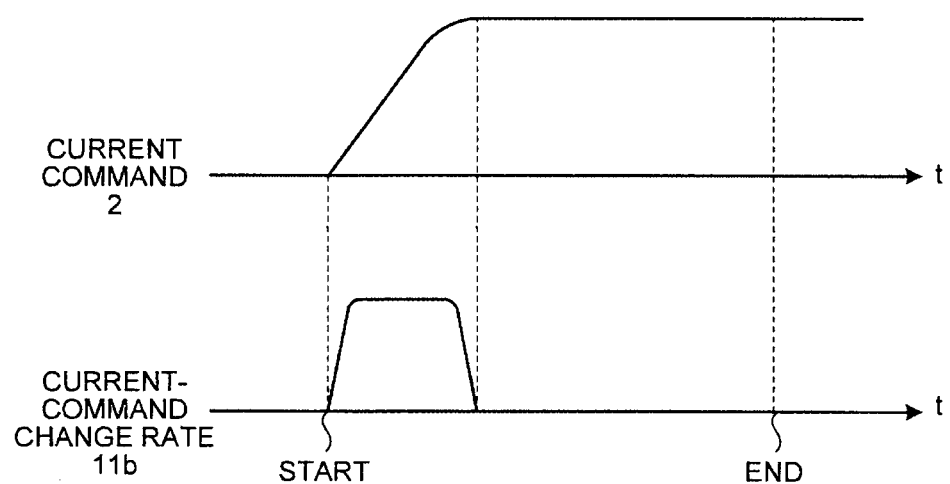

FIG.10
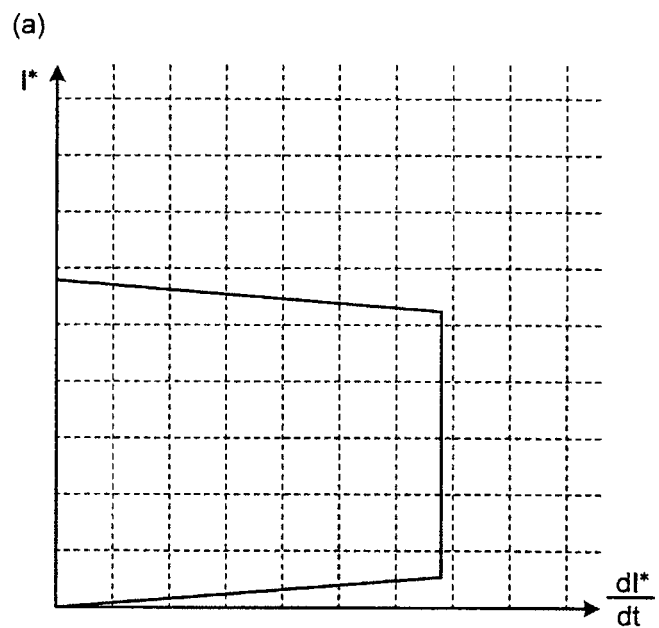
(a)
(LOCUS RECORDING MAP 11j)
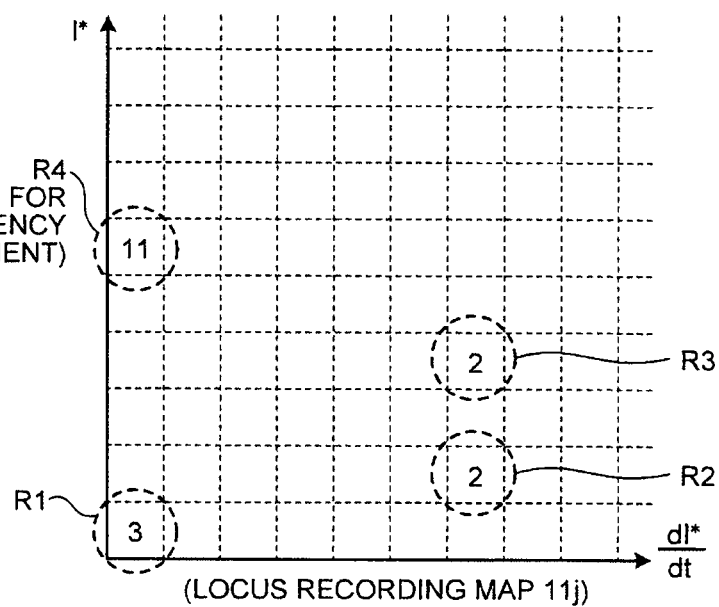
(b)
(LOCUS RECORDING MAP 11j)

FIG.11
(a)
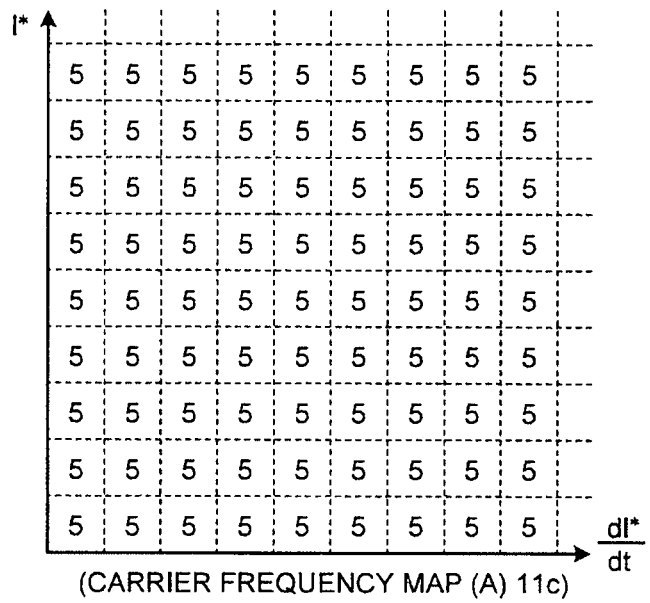
(CARRIER FREQUENCY MAP (A) 11c)
(b)
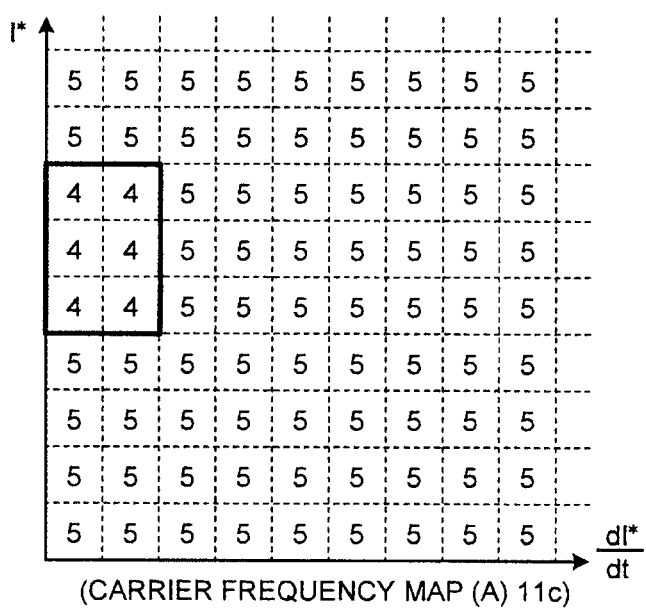
(CARRIER FREQUENCY MAP (A) 11c)

CONTROLLER OF POWER CONVERTER

TECHNICAL FIELD

The present invention relates to a controller of a power converter that is applied to a power converter including an inverter constituted by plural semiconductor switching elements and controls a switching element of the inverter using pulse width modulation (hereinafter, "PWM").

BACKGROUND ART

With regard to power converters, there is a carrier comparison method as one of representative methods of calculating a switching pattern to PWM control a semiconductor switching element constituting an inverter. According to the carrier comparison method, a voltage command to the inverter and a size of a carrier wave are compared, thereby determining an on/off pattern to perform a switch control. A triangular wave is often used as the carrier wave.

In a power converter using the carrier comparison method, a frequency of a carrier wave (hereinafter, "carrier frequency") is an important parameter to determine a characteristic of the power converter. For example, when a carrier frequency is set at a high level, there is an effect such that the accuracy and response characteristic of an inverter output voltage improve, and thus electromagnetic noise generated from a load is reduced. On the other hand, when the carrier frequency is set at a high level, there is a problem such that a switching loss of a semiconductor switching element increases, and thus electromagnetic noise also increases. Therefore, an appropriate carrier frequency needs to be set by matching the type of a load connected to the inverter and its operating condition.

In performing a current control of a load connected to the inverter, a high current-control response is achieved by shortening an updating cycle of an output voltage by increasing a carrier frequency. Meanwhile, when a current control is continued by keeping a high carrier frequency, a switching loss of the inverter increases. That is, high response of current control and suppression of a switching loss of the inverter are in a tradeoff relationship, and therefore the carrier frequency needs to be determined by taking one of these factors with priority.

As a technique of solving such a problem, for example, there is a technique disclosed in Patent Document 1 mentioned below. Patent Document 1 discloses a technique of changing a carrier frequency according to a deviation (a control deviation) between a current command and a detected current. Specifically, when a control deviation is large, a carrier frequency is increased to improve its response characteristic. On the other hand, when the control deviation is small or none, the carrier frequency is decreased based on an idea that the control is being performed satisfactorily. That is, this method has a technical concept of increasing the carrier frequency only when a control response is necessary. Patent Document 1 also discloses a technique of changing a carrier frequency corresponding to a change rate of a current deviation based on a change rate of a detected current and a change rate of a current command, and has the same object as that of the above technique.

Patent Document 1: Japanese Patent Application Laid-open No. 2001-37248

DISCLOSURE OF INVENTION

Problem to be Solved by the Invention

As described above, according to the technique disclosed in Patent Document 1 mentioned above (hereinafter, "conventional technique"), it becomes possible to achieve both loss suppression of an inverter and a current control response. However, the conventional technique has the following problems.

First, the conventional technique has a problem such that compatibility of a current control response and an inverter switching loss suppression cannot be achieved sufficiently. This problem may be explained as follows. That is, because an inverter switching loss value changes according to a current, the loss becomes small when an absolute value of a current is small, and a current control response may be improved by increasing a carrier frequency. However, according to the method of the conventional technique, information on a current magnitude disappears when a carrier frequency is changed according to a control deviation of a current. Therefore, this characteristic may not be utilized effectively. According to the conventional technique, signals of a current command and a change rate thereof and a detected current and a change rate thereof are referred to at the time of changing a carrier frequency. However, because a carrier frequency is obtained by independently referring to each signal and also because a carrier frequency to be actually used is determined by adding these carrier frequencies, it may not be said that an operation status of a power converter is fully taken into account.

Second, according to the conventional technique, because a detected current and a change rate thereof are referred to, in a current control system in which a sampling timing of a detected current is not synchronous with a crest of a carrier wave (a triangular wave), the current control system is influenced by a current ripple and noise, and thus there is a problem that the current control system cannot set a stable carrier frequency. As a result, the conventional technique has an intrinsic problem that not only a target performance may not be achieved but also setting itself of a carrier frequency is fluctuated, and the current control system becomes unstable in the worst case.

The present invention has been made in view of the above problems, and an object of the invention is to provide a controller of a power converter capable of stably changing a carrier frequency and capable of achieving both a current control responsiveness and loss suppression of an inverter in an improved manner.

Means for Solving Problem

To solve the above problems and achieve the objects controller of a power converter that is applied to a power converter having an inverter includes a plurality of semiconductor switching elements, and controls a switching element of the inverter by using pulse width modulation, the controller includes: a current command generator that generates a current command; a current control unit that generates a voltage command to pass a desired current to a load connected to the inverter based on the current command; a carrier-frequency setting unit that sets a carrier frequency command used to perform pulse width modulation to the inverter corresponding to the current command and a change rate of the current command; and a switching pattern calculator that calculates a switching pattern command by performing the pulse width modulation based on the voltage command and the carrier frequency command, wherein the carrier-frequency setting unit has a first two-dimensional map having mapped thereon information of a carrier frequency corresponding to the current command expressed in one of orthogonal axes and a change rate of the current command expressed in the other of the orthogonal axes, and outputs to the switching pattern calculator information of a carrier frequency on the first two-dimensional map corresponding to an input current command and a change rate of the input current command.

Effect of the Invention

According to the controller of a power converter of the present invention, the carrier-frequency setting unit that sets a carrier frequency command used for pulse width modulation of an inverter includes the first two-dimensional map having mapped thereon information of a carrier frequency corresponding to a current command expressed in one of orthogonal axes and a change rate of the current command expressed in the other of the orthogonal axes. The carrier-frequency setting unit outputs to the switching pattern calculator, information of carrier frequency on the first two-dimensional map corresponding to an input current command and a change rate of the input current command. The switching pattern calculator calculates a switching pattern command to perform pulse width modulation based on a voltage command and a carrier frequency command output from the carrier-command setting unit, and outputs the switching pattern to the inverter. Therefore, the controller may stably change the carrier frequency, and may achieve both a current-control response enhancement and loss suppression of an inverter in an improved manner.

BRIEF DESCRIPTION OF DRAWINGS

FIGS. 2(a) and 2(b) depict an example of a current-command change-rate calculator and an output characteristic of the example.

FIGS. 10(a) and 10(b) depict an example of a locus recording map.

FIGS. 11(a) and 11(b) depict an example of a carrier frequency map generated by adjusting a locus recording map.

EXPLANATIONS OF LETTERS OR NUMERALS

Figure 1:
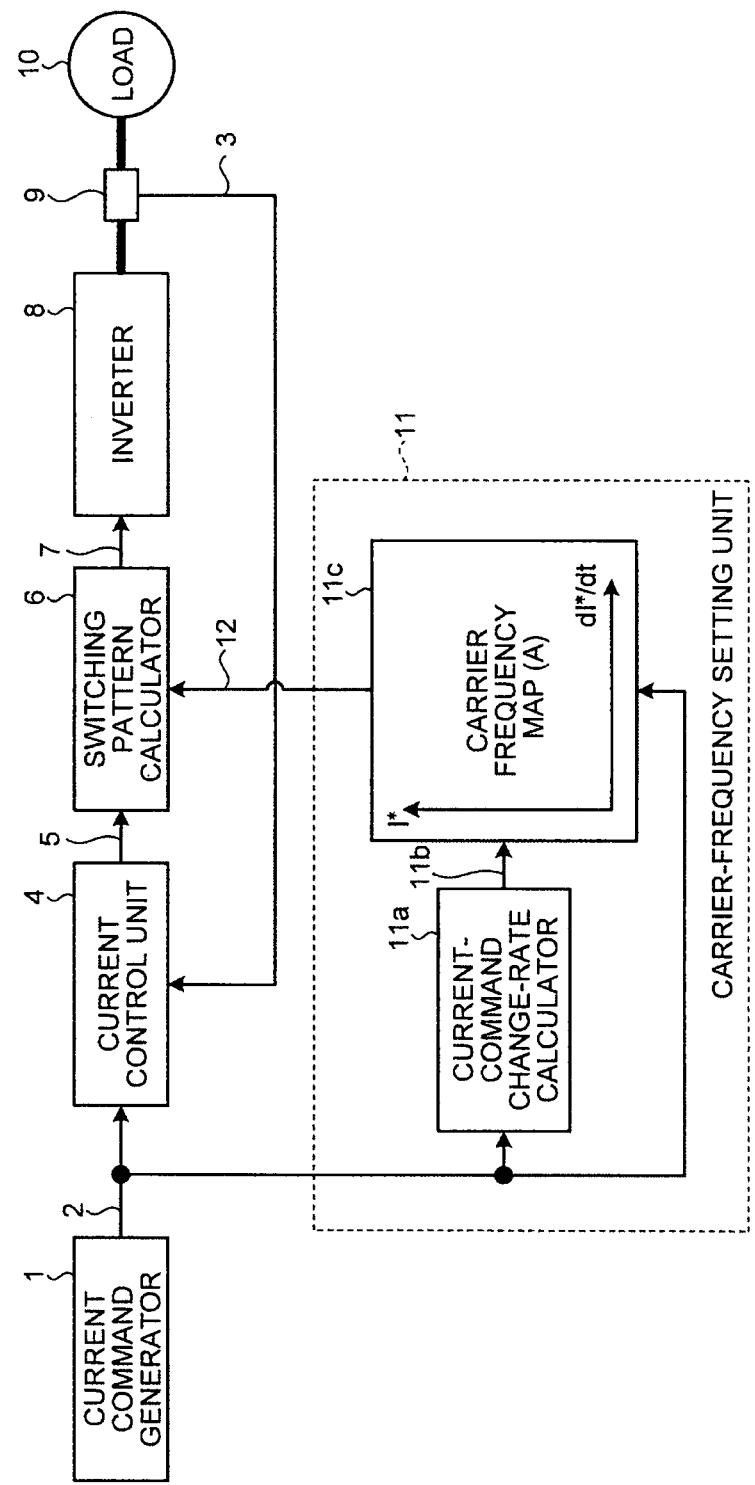
FIG. 1 depicts a configuration of a controller of a power converter according to a first embodiment of the present invention.

1 Current command generator
2 Current command
3 Detection current signal
4 Current control unit
5 Voltage command
6 Switching pattern calculator
7 Switching pattern command
8 Power converter (inverter)
9 Current detector
10 Load
11 Carrier-frequency setting unit
11a Current-command change-rate calculator
11b Current-command change rate
11c Carrier frequency map (A)
11d Carrier frequency map (B)
11e Carrier-frequency update signal
11f Carrier frequency map (C)
11g Current-control-response-command correction-signal setting unit
11h Current-control-response-command correction signal
11i Carrier frequency map (D)
11j Locus recording map
11k Locus information analyzer
12 Carrier frequency command
13 Coordinate converting unit (to convert rotational coordinate to rest coordinate)
14 Voltage command (alternate current)
15 Coordinate converting unit (to convert rest coordinate to rotational coordinate)
16 Detection current signal (after coordinate conversion)
17 Phase/frequency generator
18 Phase signal
19 Frequency signal
20 Current-control-response setting unit
21 Current-control response command
22 Current-control response command (after correction)
112 Change-rate calculation filter
113 Absolute value calculator (ABS)
114 Lowpass filter (LPF)

BEST MODE(S) FOR CARRYING OUT THE INVENTION

Exemplary embodiments of a controller of a power converter according to the present invention will be explained below in detail with reference to the accompanying drawings. The present invention is not limited to the embodiments.

First Embodiment (Configuration of Controller)

A configuration of a controller of a power converter according to a first embodiment, that is, the configuration of the controller according to the first embodiment to control the power converter, is explained first. FIG. 1 depicts the configuration of the controller of a power converter according to the first embodiment of the present invention. An inverter, a load connected to the inverter, and a current detector are also illustrated in FIG. 1 for explanation.

In FIG. 1, the controller according to the present embodiment includes a current command generator 1, a current control unit 4 and a carrier-frequency setting unit 11 to which an output signal of the current command generator 1 is input, and a switching pattern calculator 6 to which an output signal of the current control unit 4 and an output signal of the carrier-frequency setting unit 11 are input. The carrier-frequency setting unit 11 includes a current-command change-rate calculator 11a to which an output signal of the current command generator 1 is input, and a carrier frequency map 11c to which an output signal of the current command generator 1 and an output signal of the current-command change-rate calculator 11a are input. An output signal of the switching pattern calculator 6 is input to an inverter 8. A current detector 9 is provided between the inverter 8 and a load 10 driven by the inverter 8. A signal detected by the current detector 9 is fed back to the current control unit 4.

(Operation of Controller)

An operation of the controller according to the first embodiment is explained next with reference to FIG. 1. A current command 2 is input from the current command generator 1 to the current control unit 4. A detection current signal 3 is also input to the current control unit 4. The current control unit 4 generates a voltage command 5 to supply a desired current to the load 10, and outputs the voltage command 5 to the switching pattern calculator 6. The switching pattern calculator 6 performs pulse width modulation (PWM) based on the input voltage command 5, generates a switching pattern command 7, and outputs the switching pattern command 7 to the inverter 8. The switching pattern command 7 explained in this part is assumed to use an asynchronous PWM system that performs a pattern generation by comparing a magnitude of a voltage command with a magnitude of a carrier wave. The inverter 8 includes a plurality of semiconductor switching elements, operates according to the switching pattern command 7, and supplies a desired current to the load 10. The current detector 9 detects a current supplied from the inverter 8 to the load 10, and feeds back the detected current to the current control unit 4. The carrier-frequency setting unit 11 outputs a carrier frequency command 12, generated based on the current command 2, to the switching pattern calculator 6.

Based on a control system configured as described above, the switching pattern calculator 6 generates the switching pattern command 7 in a carrier wave corresponding to the input carrier frequency command 12. By adopting the above-mentioned control system, a carrier frequency may be changed based on the current command information. Further, because the detection current signal 3 is not used to generate the carrier frequency command 12 in the present control system, a carrier frequency may be stably changed even when a current control operation is not synchronous with a carrier wave. Although, in the present control system, a configuration of feeding back the detection current signal 3, detected by the current detector 9, to the current control unit 4 is explained, feedback information based on the detection current signal 3 is not necessary when it is possible to estimate a load current within the current control unit 4, for example.

(Operation of Carrier-Frequency Setting Unit)

Figure 3:
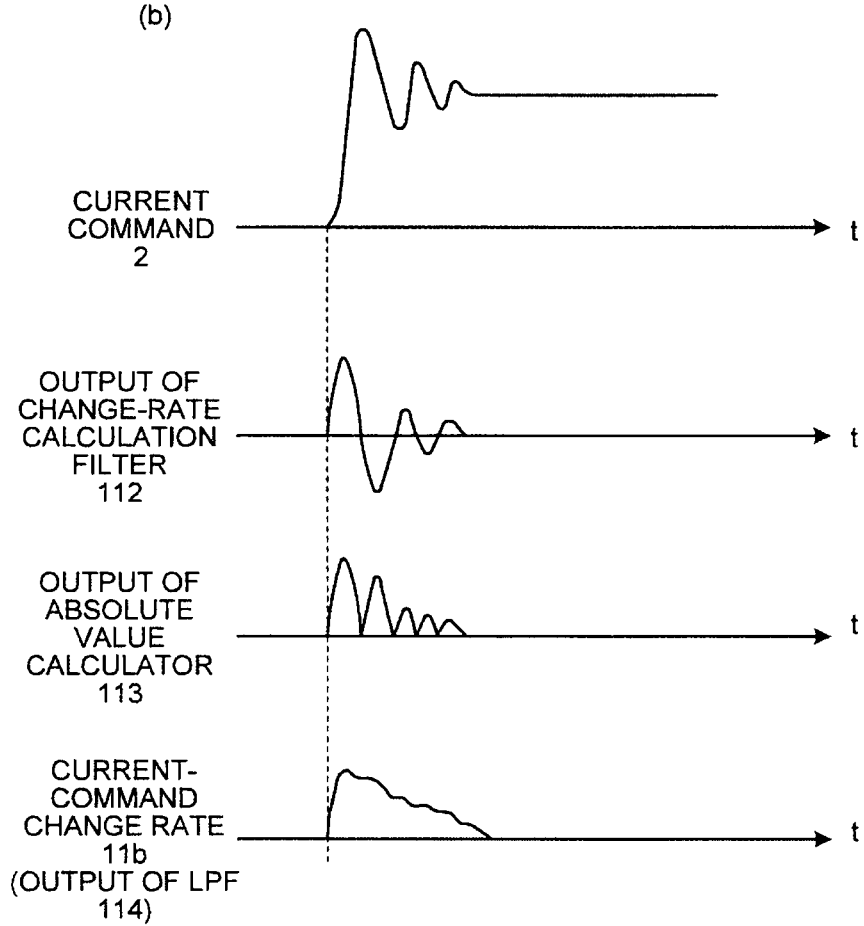
FIGS. 3(a) and 3(b) depict an example of the current-command change-rate calculator different from that of FIG. 2 and an output characteristic of the example.

An operation of the carrier-frequency setting unit 11 is explained next with reference to FIGS. 1 to 3. FIGS. 2(*a*) and 2(*b*) depict an example of the current-command change-rate calculator 11a, and an output characteristic of constituent elements of the example. FIGS. 3(*a*) and 3(*b*) depict an example of the current-command change-rate calculator 11a different from that of FIG. 2 and an output characteristic of constituent elements of the example.

As described above, the carrier-frequency setting unit 11 includes the current-command change-rate calculator 11a, and the carrier frequency map 11c. The current-command change-rate calculator 11a calculates a change rate of the input current command 2, and outputs a result to the carrier frequency map 11c. The carrier frequency map 11c generates the carrier frequency command 12, based on the input current command 2 and the change rate of the current command 2, and outputs the carrier frequency command 12. The carrier frequency map 11c holds a carrier frequency map (A) (a first two-dimensional map) as a two-dimensional map obtained by mapping carrier frequency information corresponding to a current command expressed in one of orthogonal axes (a vertical axis in the example of FIG. 1) and a current-command change rate expressed in the other of the orthogonal axes (a lateral axis in the example of FIG. 1). In the explanations hereinafter, when a carrier frequency map itself held in the carrier frequency map 11c is referred to, this carrier frequency map is described as the carrier frequency map (A).

A calculation of a current-command change rate by the current-command change-rate calculator 11a becomes a differential operation. Therefore, there is a risk of the occurrence of an excess signal. When the occurrence of an excess signal is not desirable in incorporating the controller on the power converter, it is preferable to use a filter which cuts a gain in a specific frequency or higher. As an example of this preferable filter, a filter having a transfer function as described in the following (1-1) equation may be used.

$$G(s)=s/(1+T \cdot s) \tag{1-1}$$

In the above equation, "T" is a parameter to determine a band, and "s" is a Laplace variable.

In this case, the current-command change-rate calculator 11a has a change-rate calculation filter 112 as illustrated in FIG. 2(*a*). A waveform of a current-command change rate obtained by the current-command change-rate calculator 11a becomes as illustrated in FIG. 2(*b*), for example.

As illustrated in FIG. 3(*a*), the current-command change-rate calculator 11a may include an absolute value calculator (hereinafter, "ABS") 113 and a lowpass filter (hereinafter, "LPF") 114, in addition to the change-rate calculation filter 112. In the current-command change-rate calculator 11a, the change-rate calculation filter 112 obtains a current-command change rate, the ABS 113 calculates an absolute value of the current-command change rate, and the LPF 114 performs a lowpass filter process. This current-command change-rate calculator 11a may calculate a stable current-command change rate even if a current command including a vibration as illustrated in FIG. 3(*b*) is input, for example.

(Carrier Frequency Map)

Figure 4:
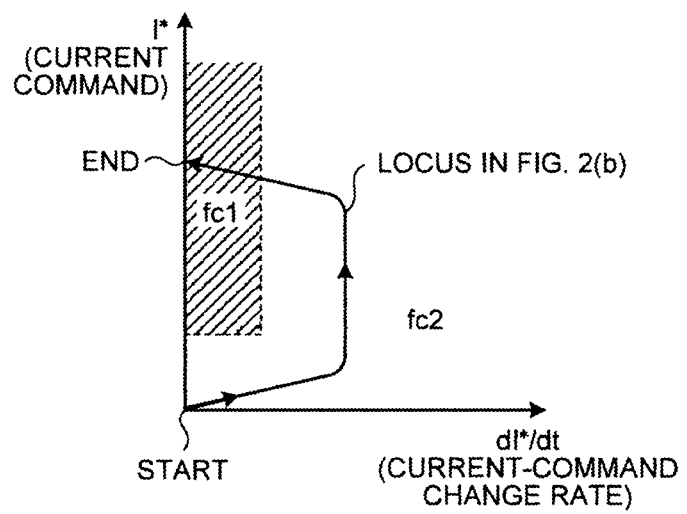
FIG. 4 is an explanatory diagram of a meaning of a carrier frequency map by using a relationship between a current-command change rate and a locus.

A carrier frequency map is explained next with reference to FIGS. 4 and 5. FIG. 4 is a diagram for explaining a meaning of the carrier frequency map by using a relationship between a current-command change rate and a locus, and FIG. 5 is an example of a carrier frequency map different from that illustrated in FIG. 4.

As described above, the carrier frequency map 11c outputs a carrier frequency command based on a current command and a change rate of the current command. In this case, a carrier frequency on the carrier frequency map illustrated in FIG. 4 is output as a carrier frequency command. In the example of FIG. 4, two types of carrier frequencies fc1 and fc2 (fc1<fc2) may be selected in accordance with values of a current command and a change rate of the current command.

In the power converter, when a general current control is to be performed, a low-current control response is acceptable when a current-command change rate is low. Therefore, a carrier frequency may be set at a low level. On the other hand, a switching loss becomes small when a current is small. Therefore, a carrier frequency may be set at a high level. FIG. 4 is an example of setting of a carrier frequency map based on this concept. For example, when a current command is as illustrated in FIG. 2(*b*), a locus as illustrated in FIG. 4 is taken. According to the carrier frequency map illustrated in FIG. 4, the carrier frequency fc2 at a high level may be set when a current-command change rate is high. On the other hand, in a region of a high current command, the carrier frequency fc1 at a low level may be set. Therefore, a high current-control response and suppression of an inverter loss may be achieved. While two types of selectable carrier frequencies are set in FIG. 4, the number of selectable carrier frequencies may be increased.

Figure 5:
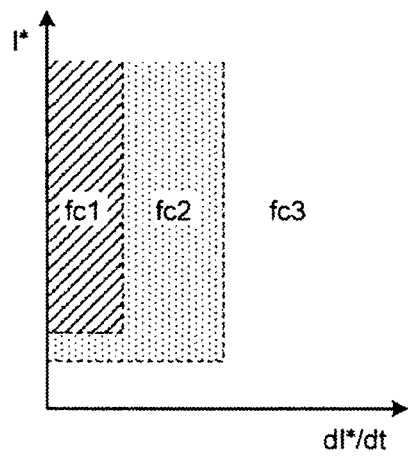
FIG. 5 is an example of a carrier frequency map different from that illustrated in FIG. 4.

For example, in FIG. 5, a higher carrier frequency (fc2<fc3) allocation is made possible in a region of a large current-control response command. According to the carrier frequency map illustrated in FIG. 5, one desired carrier frequency may be selected from among three types of carrier frequencies (fc1<fc2<fc3).

In the examples of FIGS. 4 and 5, carrier frequency maps of changing a carrier frequency at stages are illustrated. Alternatively, a control may be performed so that a carrier frequency may be changed continuously. By this control, disorder of a current associated with a change in a carrier frequency and a change in inverter operation noise may be reduced.

As explained above, according to the controller of a power converter in the present embodiment, a carrier frequency may be set corresponding to the current command information. By this control, both reduction of an inverter switching loss and enhancement of a high current-control responsiveness may be achieved. Because the control is performed by using the current command information and by using a carrier frequency map which relate a current command to a change rate of the current command, a carrier frequency may be stably changed even when a sampling of a detected current is not synchronous with a carrier wave.

While application of the switching pattern command 7 to an asynchronous PWM system has been explained in the present embodiment, the switching pattern command 7 may be also applied to a synchronous PWM system that calculates a switching pattern synchronous with the voltage command 5. For example, the switching pattern command 7 may be applied to a synchronous PWM system by setting a pulse number in one cycle of the voltage command 5 instead of setting a carrier frequency, thereby appropriately performing switching setting.

Second Embodiment

Figure 6:
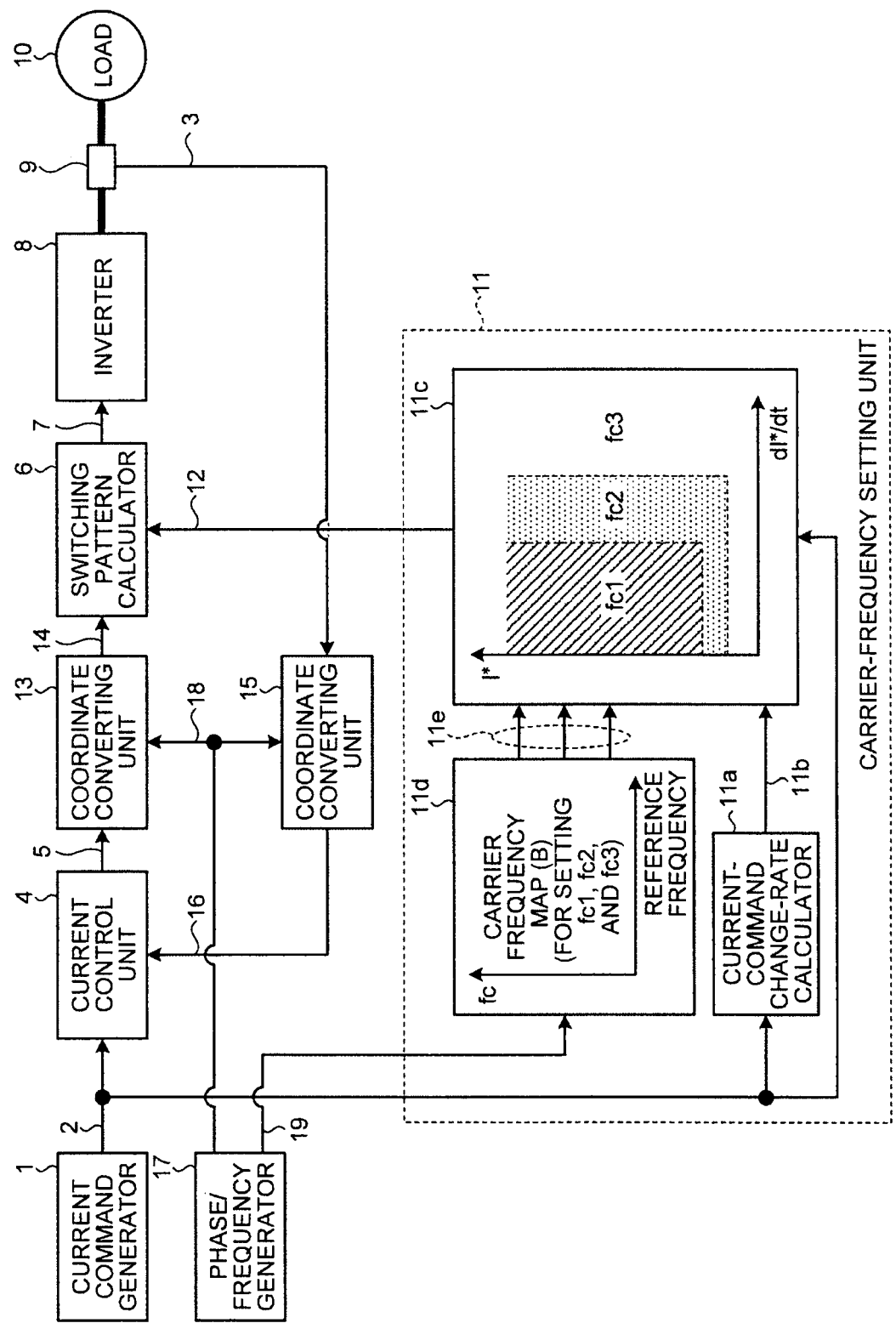
FIG. 6 depicts a configuration of a controller of a power converter according to a second embodiment of the present invention.

FIG. 6 depicts a configuration of a controller of a power converter according to a second embodiment of the present invention. Particularly in the present embodiment, an alternate current load such as an alternate current motor and the like is assumed as the load 10, to explain an effect of the present embodiment in more detail. Because the load 10 is an alternate current load, in the present embodiment, coordinate converting units 13 and 15 are further provided in addition to the configuration of the first embodiment shown in FIG. 1. The second embodiment is also different from the first embodiment in that a phase/frequency generator 17 is provided and that a carrier frequency map 11d is provided in the carrier-frequency setting unit 11. Other constituent elements of the second embodiment are identical or equivalent to those illustrated in FIG. 1, and these elements are denoted by like reference letters or numerals.

The detection current signal 3 is converted into a detection current signal 16 on biaxial orthogonal rotational coordinates by the coordinate converting unit 15, and is used for a current control. The voltage command 5 is similarly converted into an alternate-current voltage command 14 by the coordinate converting unit 13, and is used to calculate a switching pattern. The phase/frequency generator 17 outputs a phase signal 18 and a frequency signal 19. The phase signal 18 is used to convert coordinates. The frequency signal 19 corresponds to a differentiated signal of the phase signal 18. For the sake of explanation, a frequency of the frequency signal 19 output by the phase/frequency generator 17 is referred to as a reference frequency. That is, a frequency of power supplied by the inverter 8 is the reference frequency.

(Operation of Carrier-Frequency Setting Unit)

An operation of the carrier-frequency setting unit 11 according to the second embodiment is explained next with reference to FIG. 6. The controller according to the second embodiment is configured such that the frequency signal 19 is input to the carrier-frequency setting unit 11, unlike the controller according to the first embodiment illustrated in FIG. 1. It is generally known that, in supplying power to an alternate current load, a carrier frequency needs to be set sufficiently higher than a reference frequency. When a sufficient carrier frequency is not obtained, a current control system becomes unstable, and a surplus high frequency current flows to the alternate current load, thereby such problems as a loss of the alternate load increase and a loss of an inverter increase occur. Therefore, in setting a carrier frequency, it is preferable to reflect information of the reference frequency.

FIG. 6 depicts a configuration of the carrier-frequency setting unit 11 capable of selecting three types of carrier frequencies, as an example. As described above, the current-command change-rate calculator 11a, and the carrier frequency map 11c having the carrier frequency map (A), are identical to or equivalent to those explained in the first embodiment. Further, in the second embodiment, the carrier frequency map 11d is additionally provided. Hereinafter, when a carrier frequency map itself held in the carrier frequency map 11d is referred to, this carrier frequency map is described as a carrier frequency map (B).

The carrier frequency map 11d is an operating unit receiving an input of the frequency signal 19 and outputting a carrier-frequency update signal 11e. The carrier frequency map 11d holds the carrier frequency map (B) as a one-dimensional map (a first one-dimensional map) and describing setting information of fc1 to fc3. The carrier-frequency update signal 11e is a value of carrier-frequency options fc1, fc2, and fc3 (fc1<fc2<fc3) in the carrier frequency map 11c (the carrier frequency map (A)). That is, one carrier frequency is selected from among three types of carrier frequencies in the carrier frequency map (A) based on the current command 2 and a current-command change rate 11b. This value is determined by the carrier frequency map (B).

A carrier frequency reflecting a reference frequency can be set by the control system configured as described above. By providing this control system, the stability of a current control system corresponding to the reference frequency may be secured, and a carrier frequency may be set to minimize a loss of the inverter 8 and a loss of the load 10 or the total of these losses.

As explained above, according to the controller of a power converter of the present embodiment, a carrier frequency may be set corresponding to the current command information and a reference frequency. By this control, in supplying power to an alternating current load of an alternating current motor and the like, both reduction of an inverter switching loss and enhancement of a high current-control responsiveness may be achieved, and stable current control may be also secured.

In the present embodiment, it has been explained that the carrier-frequency update signal 11e output from the carrier frequency map 11d is a value of the carrier-frequency options fc1, fc2, and fc3 in the carrier frequency map (A). However, the carrier-frequency update signal 11e does not necessarily need to be a value of the options. Alternatively, in a control system, the carrier frequency map 11c may naturally select a value nearest to the carrier-frequency update signal 11e based on a value indicated as the carrier-frequency update signal 11e.

Third Embodiment

Figure 7:
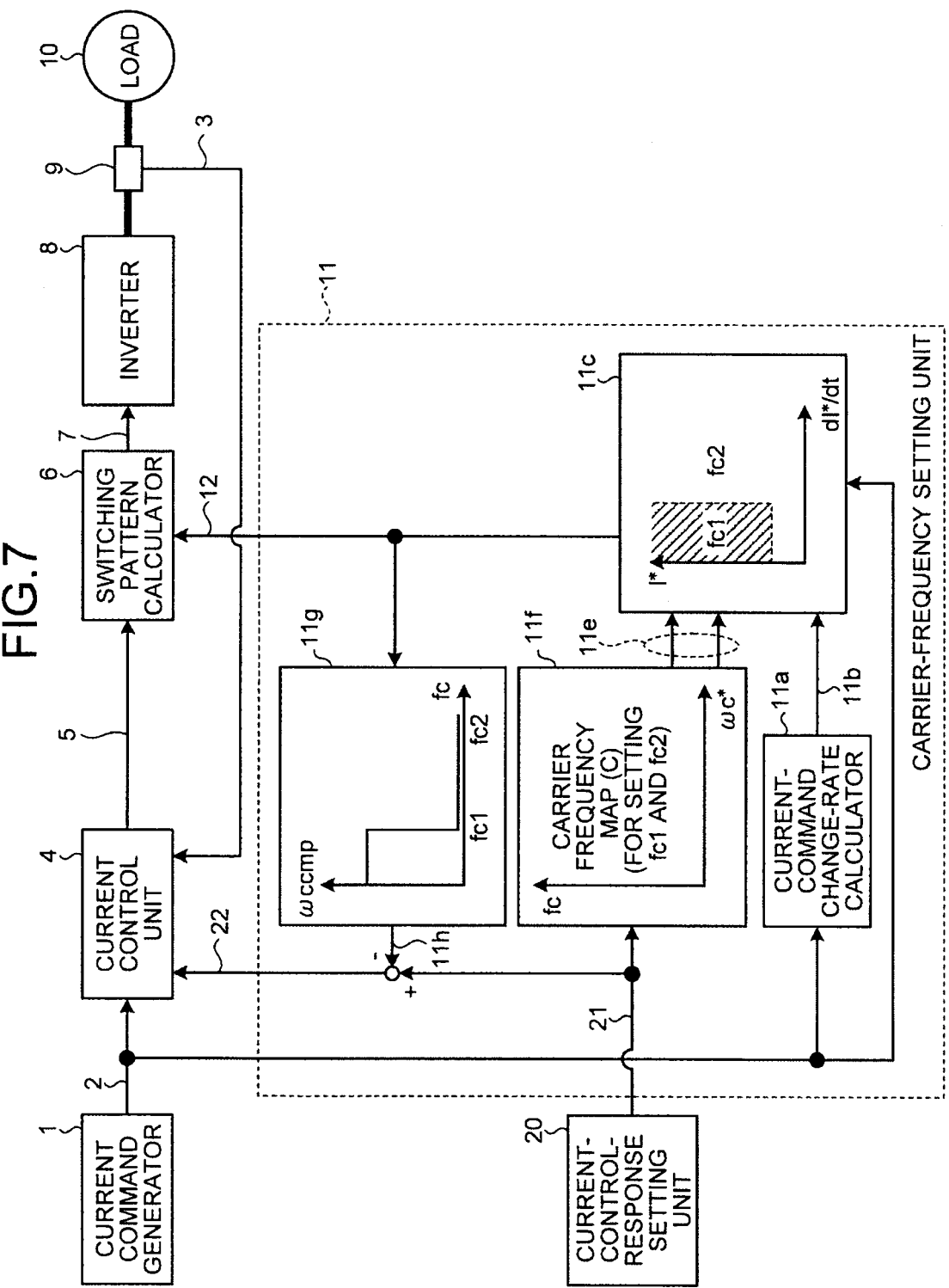
FIG. 7 depicts a configuration of a controller of a power converter according to a third embodiment of the present invention.

FIG. 7 depicts a configuration of a controller of a power converter according to a third embodiment of the present invention. In the present embodiment, a carrier frequency is decreased while keeping a response characteristic of a current control system at a predetermined value, thereby reducing a switching loss of an inverter.

In the present embodiment, in addition to the configuration of the first embodiment illustrated in FIG. 1, a current-control-response setting unit 20 is provided, and a carrier frequency map 11f and a current-control-response-command correction-signal setting unit 11g are provided within the carrier-frequency setting unit 11. Other constituent elements of the third embodiment are identical or equivalent to those illustrated in FIG. 1, and these elements are denoted by the same reference letters or numerals as in FIG. 1.

The current-control-response setting unit 20 sets and outputs an appropriate current-control response command 21 corresponding to an operation status of the entire controller. The current-control response command 21 is input to the carrier-frequency setting unit 11, and is used to set a carrier frequency. The current-control response command 21 is also used as a current-control response command to control the current control unit 4. However, the current-control response command 21 itself is not input to the current control unit 4, but a current-control response command 22 after being corrected corresponding to the carrier frequency command 12 is input to the current control unit 4.

(Operation of Carrier-Frequency Setting Unit)

An operation of the carrier-frequency setting unit 11 according to the third embodiment is explained next with reference to FIG. 7. In FIG. 7, the carrier frequency map 11f is a one-dimensional map (a second one-dimensional map) and holds a carrier frequency map (C) describing two types of carrier frequencies fc1 and fc2 (fc1<fc2). Similarly to the case of the carrier frequency map (A) and the carrier frequency map (B), when a carrier frequency map itself held in the carrier frequency map 11f is referred to, this carrier frequency map is described as the carrier frequency map (C).

When the carrier frequency fc2 is set to a carrier frequency satisfying the original current-control response command 21, a predetermined current-control response characteristic is obtained when a current-command change rate is high. On the other hand, when a current-command change rate is low, it may be determined that a predetermined current-control response characteristic is not required. In this case, when the carrier frequency fc1 at a low level is used, a switching loss of the inverter 8 may be reduced. However, it is necessary to prevent a current-control response command from becoming excess at the time of selecting the low carrier frequency fc1. In the present embodiment, the current-control-response-command correction-signal setting unit 11g that outputs a current-control-response-command correction signal 11h corresponding to the carrier frequency command 12 output from the carrier frequency map 11c is used. At the same time, the current-control-response-command correction signal 11h is subtracted from the original current-control response command 21, and a subtracted result is output to the current control unit 4. With this arrangement, when the low carrier frequency fc1 is selected, excess current-control response command is avoided.

As explained above, according to the controller of a power converter of the present embodiment, a switching loss of the inverter may be reduced by lowering a carrier frequency while keeping a response characteristic of a current control system at a predetermined value. For example, when the load 10 is an actuator or a motor of which control of a position and a speed is required, the current command generator 1 includes a position control system and a speed control system. In this case, when a response characteristic of the current control system that becomes a lower loop may maintain a predetermined value, a position control system and a speed control system as an upper loop may be designed easily.

Fourth Embodiment

Figure 8:
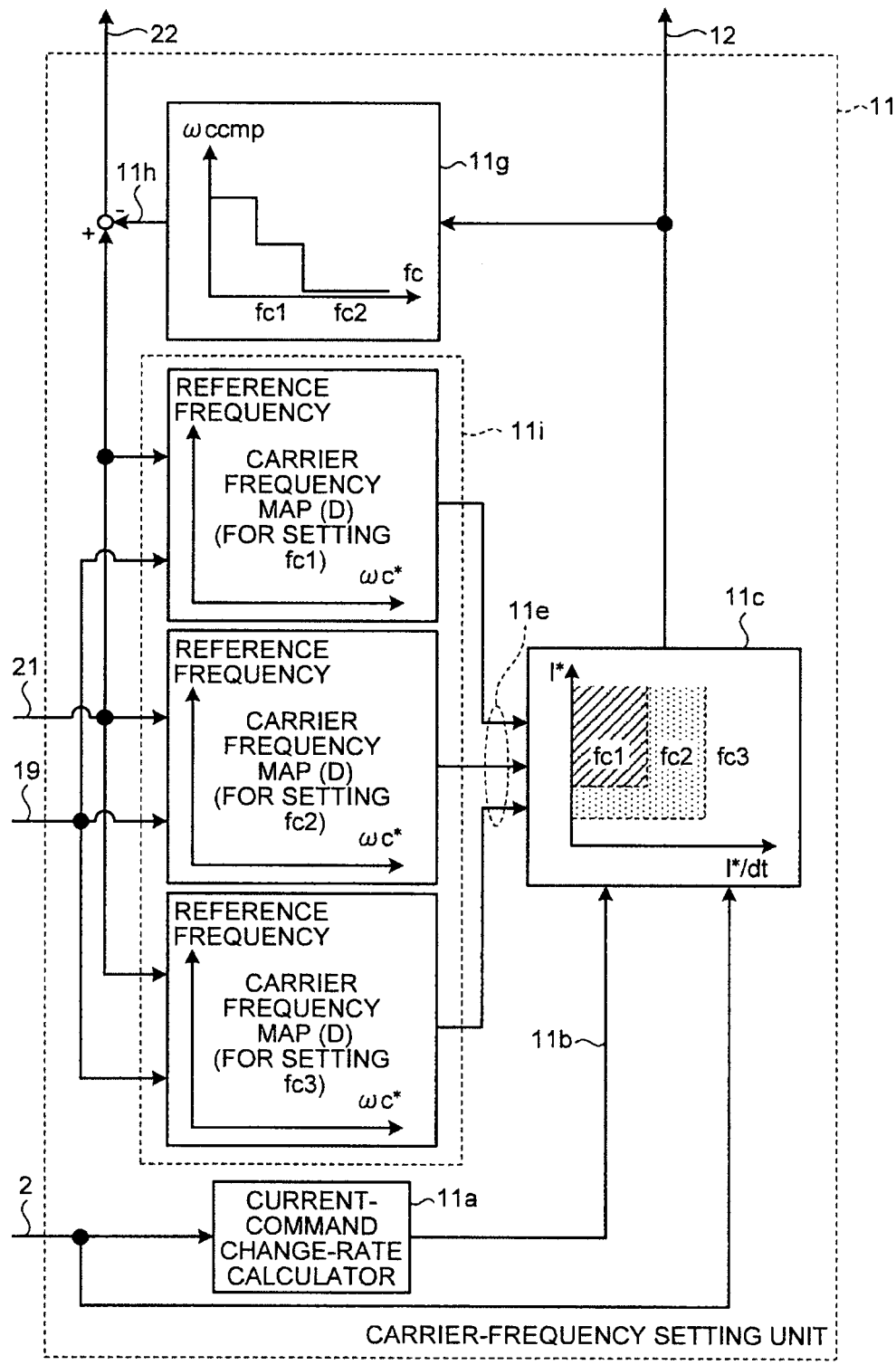
FIG. 8 depicts a configuration of a controller of a power converter according to a fourth embodiment of the present invention.

FIG. 8 depicts a configuration of a controller of a power converter according to a fourth embodiment of the present invention. In the second embodiment illustrated in FIG. 6, a method of setting a carrier frequency by using reference frequency information based on the current command information is explained. In the third embodiment illustrated in FIG. 7, a method of setting a carrier frequency by using current-control-response command information based on the current command information is explained. These pieces of reference frequency information and current-control-response command information may naturally be used in combination. In the present embodiment, a control system is configured by further using reference frequency information and current-control-response command information based on the current command information. In FIG. 8, a control system capable of selecting three types of carrier frequencies fc1, fc2, and fc3 (fc1<fc2<fc3) is configured as an example, and constituent elements identical or equivalent to those illustrated in FIGS. 6 and 7 are denoted by the same reference letters or numerals.

In FIG. 8, the carrier-frequency setting unit 11 is provided with three carrier frequency maps D (for setting fc1, for setting fc2, for setting fc3). A carrier frequency map 11i is a two-dimensional map (a second two-dimensional map) having mapped thereon carrier frequency information corresponding to the frequency signal 19 expressed as a reference frequency in one of orthogonal axes (a vertical axis in the example of FIG. 8) and the current-control response command 22 expressed in the other of the orthogonal axes (a lateral axis in the example of FIG. 8). In the carrier frequency map 11i, the carrier frequency map D is referred by inputting the frequency signal 19 and the current-control response command 21, thereby determining a carrier frequency value to be allocated to fc1 to fc3 of the carrier frequency map 11c (that is, the carrier frequency map (A)). Other operations of each block are identical or equivalent to those explained in the second and third embodiments, and detailed explanations thereof will be omitted.

According to the controller of a power converter of the present embodiment, the stability of a current control system may be secured while keeping a response characteristic of the current control system at a predetermined value, and further, the carrier frequency may be appropriately decreased.

Fifth Embodiment

Figure 9:
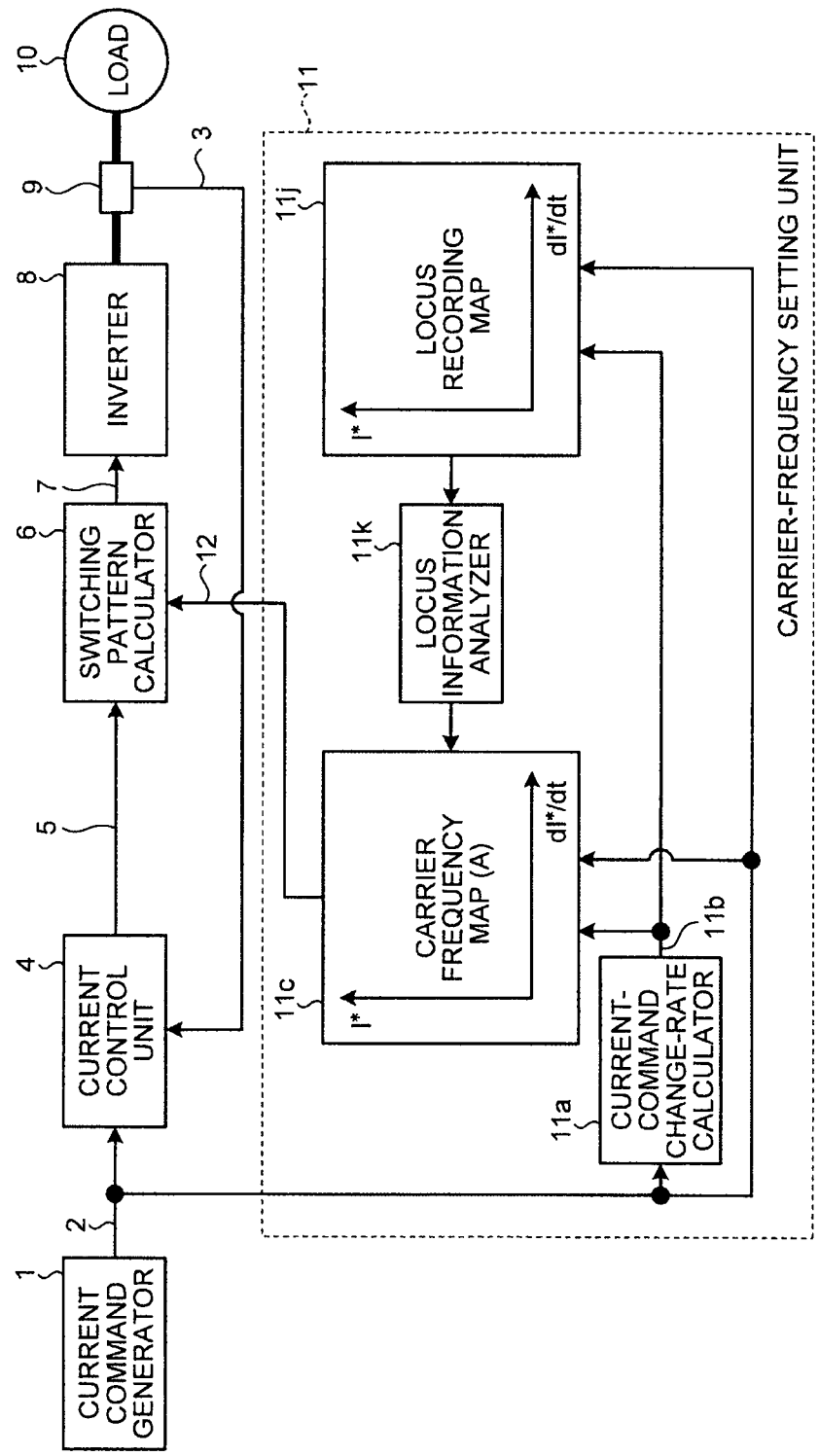
FIG. 9 depicts a configuration of a controller of a power converter according to a fifth embodiment of the present invention.

FIG. 9 depicts a configuration of a controller of a power converter according to a fifth embodiment of the present invention. In the first embodiment illustrated in FIG. 1, the carrier frequency map (A) needs to be set in advance in the carrier frequency map 11c of the carrier-frequency setting unit 11. In the fifth embodiment, a method of automatically setting and adjusting the carrier frequency map (A) is explained. The carrier-frequency setting unit 11 illustrated in FIG. 9 includes a locus recording map 11j and a locus information analyzer 11k, in addition to the configuration in the first embodiment illustrated in FIG. 1. Other constituent elements of the fifth embodiment are identical or equivalent to those illustrated in FIG. 1, and these elements are denoted by the same reference letters or numerals as in FIG. 1.

Figure 12:
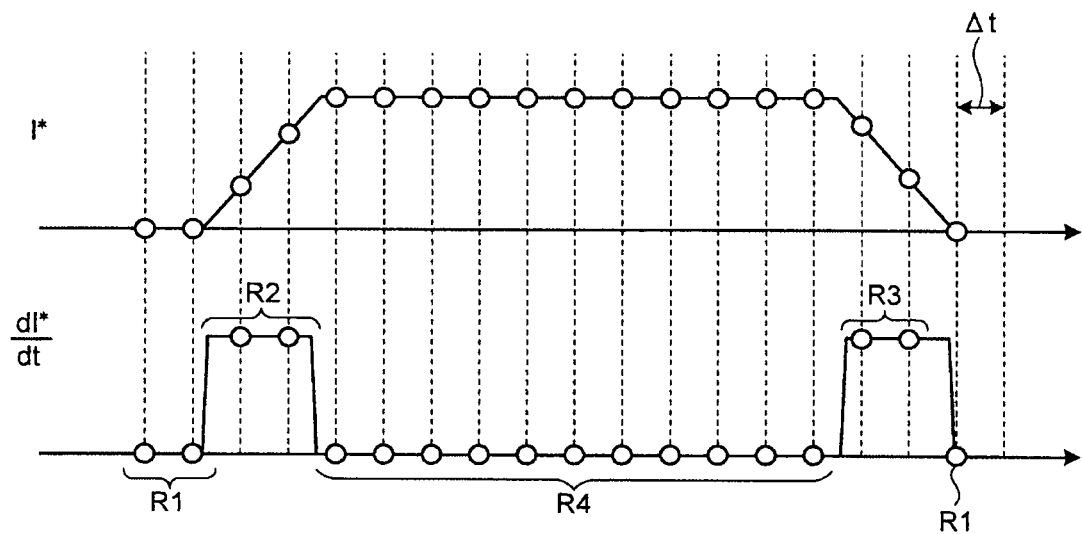
FIG. 12 is an explanatory diagram of an operation of a locus recording map using a current command and a current-command change rate.

Operations of the locus recording map 11j and the locus information analyzer 11k are explained in detail next with reference to FIG. 9 to FIG. 12. FIGS. 10(a) and 10(b) depict an example of a locus recording map, and FIGS. 11(a) and 11(b) depict an example of a carrier frequency map generated by adjusting a locus recording map. FIG. 12 is an explanatory diagram of an operation of a locus recording map using a current command and a current-command change rate.

The locus recording map 11j is a two-dimensional map having recorded (mapped) thereon a transition of a locus expressing a relationship between a current command expressed in one of orthogonal axes (a vertical axis in the example of FIGS. 10(a) and 10(b)) and a current-command change rate expressed in the other of the orthogonal axes (a lateral axis in the example of FIGS. 10(a) and 10(b)), and the number of times when the locus passes a predetermined region (same as a remaining time). The predetermined region is that determined by a predetermined width at one side of the orthogonal axes and a predetermined width at the other side of the orthogonal axes, surrounded by a broken line in FIGS. 10(a) and 10(b).

When a current command and a current-command change rate input to the locus recording map 11j respectively has a waveform as illustrated in FIG. 12, for example, a transition of a locus in the locus recording map becomes as illustrated in FIG. 10(a). In the locus recording map 11j, after a current control is started, the number of times when the locus passes a region (a region surrounded by the broken line) on the locus recording map is counted for each section at each predetermined period Δt. The locus recording map generated at this time is as illustrated in FIG. 10(b).

In the example illustrated in FIG. 10(b), the number of times when the locus passes a region R1 is 3 where both a current command and a current-command change rate are small, the number of times when the locus passes a region R2 and a region R3 is 2 where a current command is small and a current-command change rate is large, and the number of times when the locus passes a region R4 is 11 where a current command is large and a current-command change rate is small. These count values are obtained by counting portions (circles) corresponding to each region illustrated in FIG. 12. When the number of times when the locus passes is large in a region where a current command is large and a current-command change rate is small, this region is suitable for carrier frequency adjustment. For example, the region R4 illustrated in FIG. 10(b) is suitable for carrier frequency adjustment.

The locus information analyzer 11k extracts a count value described above from the locus recording map 11j, and changes carrier frequency information of the carrier frequency map (A) provided in the carrier frequency map 11c corresponding to the extracted count value.

FIG. 11(a) is the carrier frequency map (A) before an adjustment (before a change), and a certain predetermined carrier frequency (5 kHz in the example of FIG. 11(a)) is set in all regions. On the other hand, in the carrier frequency map (A) after the adjustment, a carrier frequency before the adjustment is changed to a predetermined carrier frequency (4 kHz in the example of FIG. 11(a)) which is smaller than the carrier frequency before the adjustment in a region (a region illustrated by a thick line in FIG. 11(a)) suitable for carrier frequency change. Regarding setting of a carrier frequency, a carrier frequency once set may be reset in a predetermined period longer than Δt, and this count value may be calculated again, thereby setting a carrier frequency again. With this arrangement, a carrier frequency may be appropriately set by flexibly relating to an operation status of a load.

As explained above, according to the controller of a power converter of the present embodiment, a carrier frequency map may be set by reflecting an actual operation. Further, a carrier frequency map once set may be automatically adjusted, and therefore the labor required to set and adjust the carrier frequency map may be reduced. For example, in performing a current control, a current command and a locus of a current-command change rate are recorded, and the carrier frequency may be automatically adjusted by extracting a region of remaining for a long time in a region where a current command is large and a current-command change rate is small.

The present embodiment has explained an adjusting method of lowering a carrier frequency in a region where a current command is large and a current-command change rate is small. However, the adjusting method is not limited thereto. In contrast, an adjustment of increasing a carrier frequency may be performed in a region that requires a current control response.

The present embodiment has explained an example where a configuration to automatically adjust the carrier frequency map (A) is applied to the carrier-frequency setting unit according to the first embodiment. However, it is needless to mention that this configuration may be also applied to the carrier-frequency setting unit described in the second to fourth embodiments.

INDUSTRIAL APPLICABILITY

As described above, the controller of a power converter according to the present invention enables a stable change of a carrier frequency, and is useful as an invention to achieve both a current control responsiveness and loss suppression of an inverter in an improved manner.

The invention claimed is:

1. A controller of a power converter that is applied to a power converter comprising an inverter including a plurality of semiconductor switching elements, and controls a switching element of the inverter by using pulse width modulation, the controller comprising:
a current command generator that generates a current command;
a current control unit that generates a voltage command to pass a desired current to a load connected to the inverter based on the current command;
a carrier-frequency setting unit that sets a carrier frequency command used to perform pulse width modulation to the inverter corresponding to the current command and a change rate of the current command; and
a switching pattern calculator that calculates a switching pattern command by performing the pulse width modulation based on the voltage command and the carrier frequency command, wherein
the carrier-frequency setting unit defines a carrier frequency corresponding to the current command and the change rate of the current command, and outputs information on the carrier frequency to the switching pattern calculator, and the carrier-frequency setting unit includes a first two-dimensional map having mapped thereon information of a carrier frequency corresponding to the current command expressed in one of orthogonal axes and the change rate of the current command expressed in the other of the orthogonal axes, and outputs information of a carrier frequency on the first two-dimensional map corresponding to an input current command and a change rate of the input current command to the switching pattern calculator.

2. The controller of a power converter according to claim 1, wherein the carrier-frequency setting unit comprises a first one-dimensional map having mapped thereon information of a carrier frequency corresponding to a frequency of output power of the inverter, and adjusts a value of a carrier frequency output from the first two-dimensional map by using carrier frequency information output from the first one-dimensional map.

3. The controller of a power converter according to claim 1, wherein the carrier-frequency setting comprises:
   a second one-dimensional map having mapped thereon information of a carrier frequency corresponding to a current-control response command; and
   a current-control-response-command correction-signal setting unit that sets a current-control-response-command correction signal to correct the current-control response command based on a current-control-response-command correction signal that corresponds to a carrier frequency command output from the first two-dimensional map, wherein
   the carrier-frequency setting unit adjusts a value of a carrier frequency output from the first two-dimensional map by using information of a carrier frequency output from the second one-dimensional map, and outputs the current-control-response-command correction signal to the current control unit, and
   the current control unit performs a current control operation corresponding to a current-control response command corrected by using the current-control-response-command correction signal.

4. The controller of a power converter according to claim 1, wherein the carrier-frequency setting unit comprises:
   a second two-dimensional map having mapped thereon information of a carrier frequency corresponding to a current-control response command expressed in one of orthogonal axes and a frequency of output power of the inverter expressed in the other of the orthogonal axes; and
   a current-control-response-command correction-signal setting unit that sets a current-control-response-command correction signal to correct the current-control response command based on a current-control-response-command correction signal corresponding to a carrier frequency command output from the first two-dimensional map, wherein
   the carrier-frequency setting unit adjusts a value of a carrier frequency output from the first two-dimensional map by using information of a carrier frequency output from the second two-dimensional map, and outputs the current-control-response-command correction signal to the current control unit, and
   the current control unit performs a current control operation corresponding to a current-control response command corrected by using the current-control-response-command correction signal.

5. The controller of a power converter according to claim 1, wherein the carrier-frequency setting unit comprises:
   a locus recording map that has recorded thereon a locus expressing a relationship between the current command expressed in one of orthogonal axes and a change rate of the current command expressed in the other of the orthogonal axes, counts the number of times the locus passes within each region determined by a predetermined width in the one of the orthogonal axes and a predetermined width in the other of the orthogonal axes, and has recorded thereon the counted count value; and
   a locus information analyzer that changes carrier frequency information on the first two-dimensional map corresponding to a count value extracted from the locus recording map.

\* \* \* \* \*